(12) United States Patent
Vasey

(10) Patent No.: US 7,363,579 B2
(45) Date of Patent: Apr. 22, 2008

(54) MARK-UP OF AUTOMATED DOCUMENTS

(75) Inventor: Philip E. Vasey, Histon (GB)

(73) Assignee: Business Integrity Limited (GB)

(*) Notice: Subject to any disclaimer, the term of this patent is extended or adjusted under 35 U.S.C. 154(b) by 327 days.

(21) Appl. No.: 10/933,273

(22) Filed: Sep. 3, 2004

(65) Prior Publication Data
US 2005/0050078 A1 Mar. 3, 2005

Related U.S. Application Data

(60) Provisional application No. 60/499,384, filed on Sep. 3, 2003.

(51) Int. Cl.
*G06F 17/00* (2006.01)
(52) U.S. Cl. ............... 715/277; 715/256; 715/271
(58) Field of Classification Search ........... 715/505, 715/515, 517, 256, 271, 277
See application file for complete search history.

(56) References Cited

U.S. PATENT DOCUMENTS

| | | | |
|---|---|---|---|
| 6,182,095 B1 * | 1/2001 | Leymaster et al. | 715/515 |
| 7,296,017 B2 * | 11/2007 | Larcheveque et al. | 707/6 |
| 2002/0198935 A1 * | 12/2002 | Crandall et al. | 709/203 |
| 2005/0028084 A1 * | 2/2005 | Dziejma | 715/505 |
| 2006/0190816 A1 * | 8/2006 | Vasey | 715/519 |
| 2006/0248097 A1 * | 11/2006 | Pritchard et al. | 707/100 |

FOREIGN PATENT DOCUMENTS

| | | |
|---|---|---|
| EP | 1329817 A1 | 7/2003 |
| WO | WO 0104772 A2 * | 7/1999 |
| WO | WO 03/061474 | 7/2003 |
| WO | PCT/GB2004/003759 | 2/2004 |

* cited by examiner

*Primary Examiner*—Stephen Hong
*Assistant Examiner*—Adam M. Queler
(74) *Attorney, Agent, or Firm*—Anderson Gorecki & Manaras LLP

(57) ABSTRACT

The invention provides a document generation system for generating a customised document using content elements selected by rules operating on input information, the operating information comprising transaction values. The system comprises at least one computer having a document generation program stored thereon, means to associate further rules with the transaction values, and means to evaluate said further rules to produce an indication of whether transaction values are definite, indefinite or absent in a partially customised generated document. The effect of the transaction values is represented by means of a mark-up.

20 Claims, 6 Drawing Sheets

MARK-UP OF AUTOMATED DOCUMENTS

RELATED US APPLICATIONS

This application claims the benefit of U.S. Provisional Application No. 60/499,384, filed 3 Sep. 2003.

FIELD OF THE INVENTION

The present invention relates to the automated creation of documents, and in particular, to the mark-up of transactional values within such documents.

BACKGROUND TO THE INVENTION

It is well known to generate customised documents, either manually or using an automated system, from precedents or templates.

If this is done manually, then a printed standard form or other precedent, containing blank spaces for particular relevant information, will be filled in an edited on each specific occasion it is used. Instructions may be included in the standard document to help the user insert the correct or appropriate information.

If this is done using an automated system, then an electronically stored document or template will be used, in conjunction with various logical rules and other criteria, to prompt the user for the correct information and to assemble a customised document by associating various relevant rules with variables within the template. For example, the Hot-Docs® system using a library of Form Templates, which store both static and dynamic areas of text, that are initially customised by the user, in conjunction with a questionnaire to produce a completed customised document. Necessary information relevant to the dynamic text areas may either be input directly by a user, or gathered from an Answer File. The Answer File contains information which is repeatedly used in the same or similar customised document. Various logical rules and calculation criteria are used to associate information with the template to produce a final customised document. This document may then be edited, printed or stored.

Other known automated systems include that described in WO01/04772. In this system, a server computer runs a document generation program and is capable of communicating with local or remote client computers over a local area network (LAN) or a wide area network (WAN), such as the internet. A standard document, comprising various items of known information and associated logical rules, is first translated into a form suitable for processing by the document generation program. When instructed to generate a customised document, the server first generates one or more web pages which are sent to client computers for user input of the further information required to evaluate the logical rules. Users may then submit the further information to the server. Once all the required further information has been captured, the server generates a customised document on the basis of the standard document and received further information.

For a fully customised document, which contains no conditional text as all of the information required to be complete, there is no need to provide any form of temporary document which indicates where information needs to be provided. However, it is not always possible for the user to provide enough information to allow the document generation program to generate a fully customised document. The document generation program therefore needs to find a way in which this missing information can be included in a partially customised document. For example, there may be various transaction values, such as currency values, missing, or there may be insufficient information to resolve all of the conditional clauses within the template. Therefore, the partially customised document must have the same information content as the template it is generated from, as well as the ability to cope with and indicate to the user the effect of, missing transaction values and conditional information.

WO03/061474 describes a system for the generation of partially customised documents. Although the system provides a mark up of the information which is not included in the partially customised document, such as conditional clauses, there is no facility to indicate missing or indefinite transaction values. Information relating to unresolved conditional clauses are marked-up in a prescribed manner, which may or may not be suitable for a particular user's needs.

There therefore exists a need to provide a method by which transaction values can be marked-up in a partially customised document. The mark-up used also needs to be flexible, to accommodate a particular user's needs.

SUMMARY OF INVENTION

The invention aims to address the problems of the prior art described above. The invention provides a document generation system for generating a customised document using content elements selected by rules operating on input information, the operating information comprising transaction values. The system comprises at least one computer having a document generation program stored thereon, means to associate further rules with the transaction values, and means to evaluate said further rules to produce an indication whether the transaction values are definite, indefinite or absent in a partially customised generated document.

The effect of the transaction values is represented by means of a mark-up. The mark-up may be user-defined, such as by selecting rules from a pre-determined menu.

The invention also provides a computer implemented method of document generation, wherein rules associated with the content elements are evaluated to produce a partially customised document, and specific highlight rules are evaluated to indicate, in the partially customised document, whether transaction values are definite, indefinite or absent. Such a computer implemented method may be implemented as a computer program product and stored on a computer readable medium.

The invention provides the advantages that not only can a partially customised document containing definite or indefinite transaction values, or containing content elements relating to absent transaction values be generated, but whether a particular transaction value is definite indefinite or absent can be indicated in a particular highlight style.

BRIEF DESCRIPTION OF THE DRAWINGS

The invention will now be described by way of example only, and with reference to the accompanying drawings in which.

DESCRIPTION OF PREFERRED EMBODIMENTS

The system in which embodiments of the present invention are implemented will now be briefly described. The system comprises one or more data processing means, which, where a plurality of processing means are used, are connected together using communication means. For example, client/server architecture may be used, with one of the data processing means functioning as a server, and others as clients. However, a single processing means may function as both server and client. Various configurations of client/server architecture are shown in FIGS. 1, 2 and 3.

Figure 1:
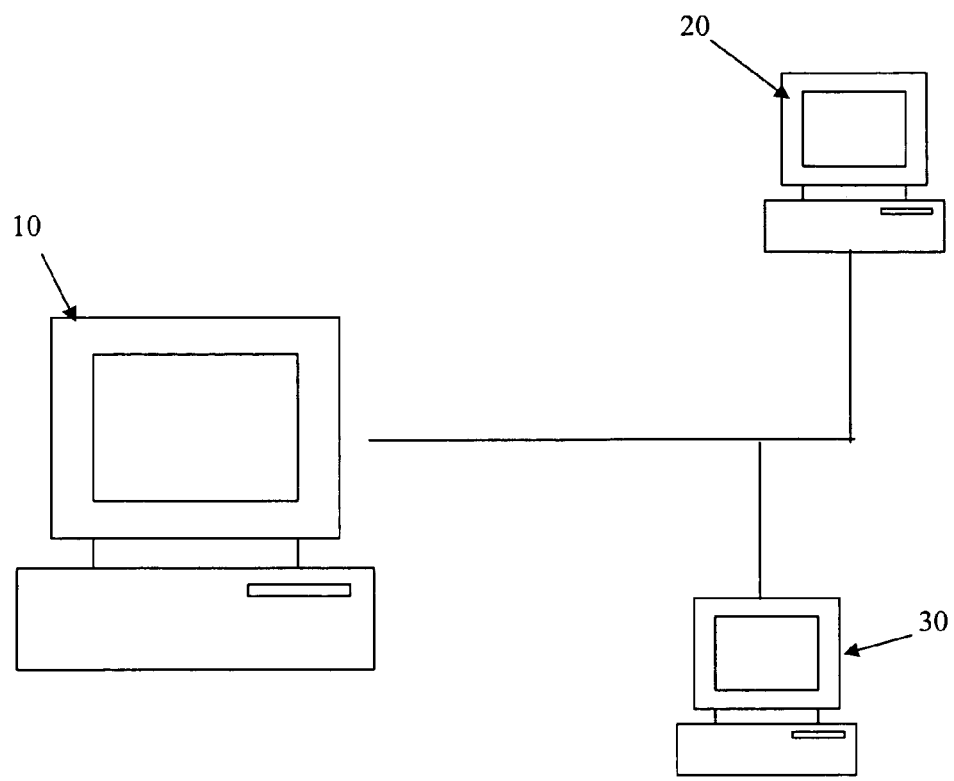
FIG. 1 illustrates a first network system in which embodiments of the invention may be carried out.

FIG. 1 shows a server computer 10 connected to two local client computers 20 and 22, connected by means of a local area network (LAN) 30, forming an intranet. Each computer 10, 20, 22, runs an operating system program, such as Microsoft Windows 2000 Professional™ and network programs such as Novell Netware™. The server computer 10 also runs a Web server application such as Microsoft Internet Information Server™, and each of the local client computers 20, 22 also run a browsing application such as Microsoft Internet Explorer™. The server 10 and local computers 20, 22 communicate using transmission control protocol/internet protocol (TCP/IP) and hypertext transfer protocol (HTTP), or alternatively, a language such as XML. The invention is not limited to any particular hardware architecture. For example, the invention could be implemented as a stand alone computer such as, for example, a PC.

Figure 2:
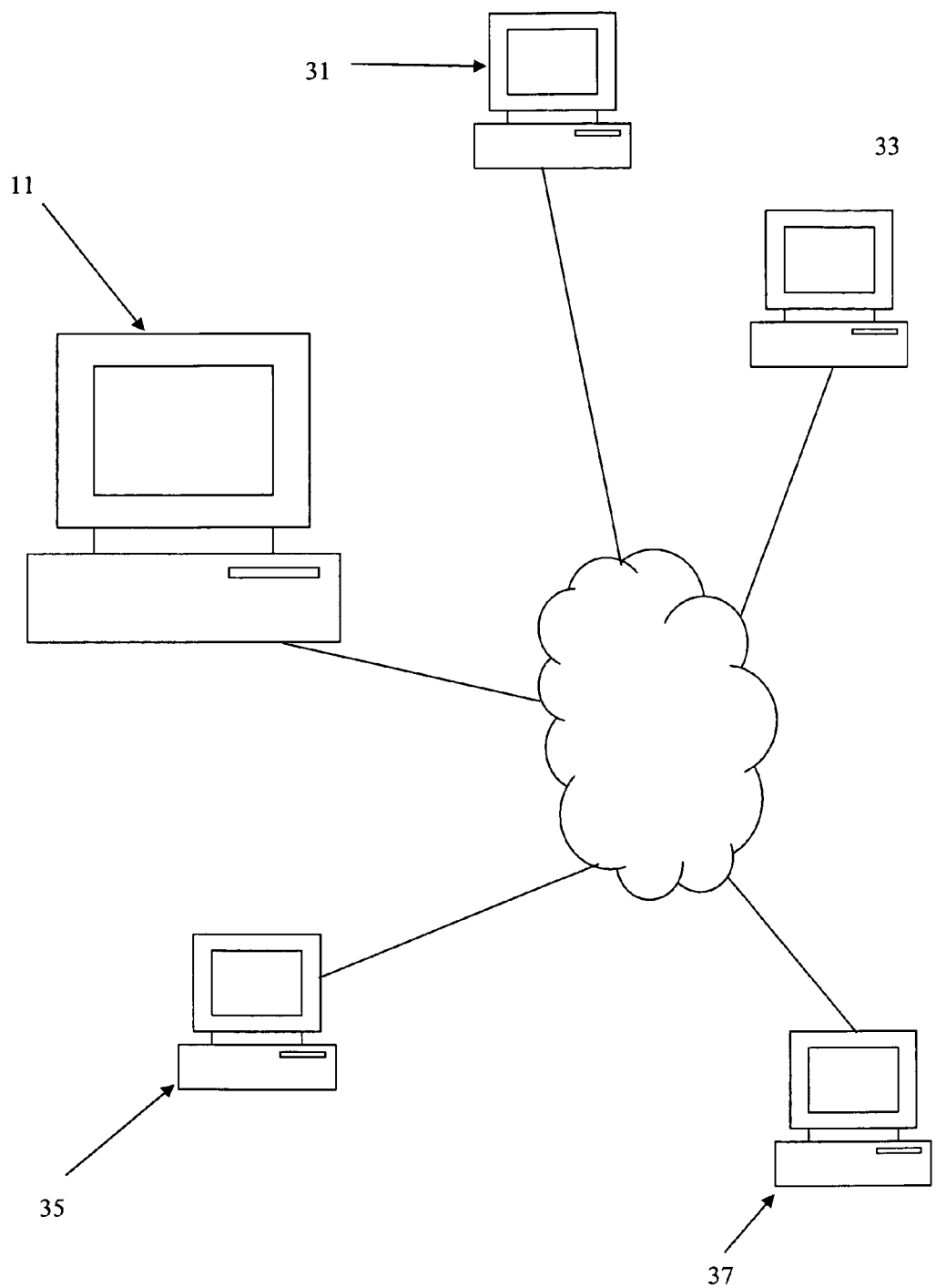
FIG. 2 illustrates a second network system in which embodiments of the invention may be carried out.

FIG. 2 shows a single server computer 11 connected to four client computers, 31, 33, 35 and 37, using a LAN, each of which runs the operating systems and browser applications mentioned above, and which communicate with the server computer 10 using TCP/IP and HTTP protocols.

Figure 3:
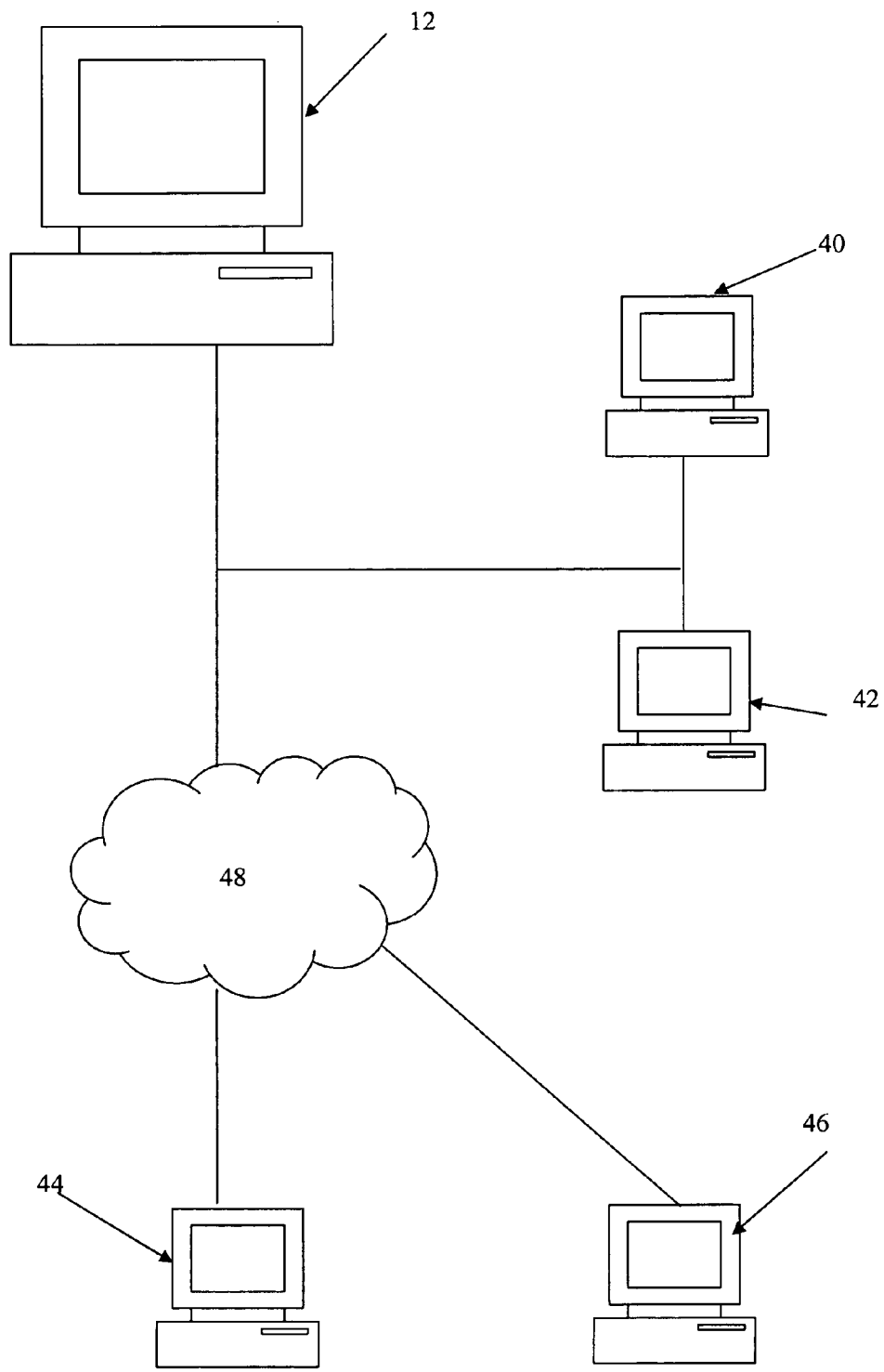
FIG. 3 illustrates a third network system in which embodiments of the invention may be carried out.

FIG. 3 shows a server computer 12 connected to two local client computers 40 and 42 using a LAN, and also connected to two remote client computers 44 and 46 through the internet 48. Each runs the operating and browser systems and browser systems mentioned above, and proxy servers and firewalls may be used to protect the intranet from unauthorised access from the internet. Again, communication within the intranet is via TCP/IP and HTTP protocols.

As FIG. 3 is the most general arrangement, embodiments of the invention will be described with respect to such a network.

One or more of the computer systems 12, 40, 42, 44 and 46 runs a word processing application such as Microsoft Word™, which is used to create document templates and may be used to view fully or partially customised documents generated by a document generation system. The document template comprises one or more content elements for possible use when generating a customised document and one or more associated rules for determining, on the basis of further information provided by a user, how to use the content elements (which may be conditional clauses or statements) when generating a customised document.

Server computer 12 also runs a document generation program, which, when provided with a template, generates one or more input forms to capture information from a user, the input forms being generated on the basis of rules contained in the template. The document generation program then generates a fully or partially customised documents on the instructions of a user. The document generation program may be run as a server program and is instructed to perform tasks by users of client browser applications.

To generate either a fully or partially customised document from a template, a user instructs the document generation program by sending URL GET or POST request from a client computer, 40, 42, 44 or 46, to the server 12. The document generation program then initiates a session with the client computer. The document generation program may generate one or more Web input forms based on the chosen template, which are passed via a Web server application to the client computer. This Web input form uses standard HTML (hyperlink mark-up language) features such as buttons, free-form entry boxes, tick boxes, pull-down menu list boxes, radio buttons and other graphical user interface (GUI) means for inputting information. The document generation program may generate multiple input forms for distributing to and capturing further information from the users of one or more further client computers 40, 42, 44 46. The document generation program may also produce multiple forms for capturing information from the user of a single client computer in several stages. However, in the following embodiments, it is assumed that only one user of a client computer is involved.

Figure 4:
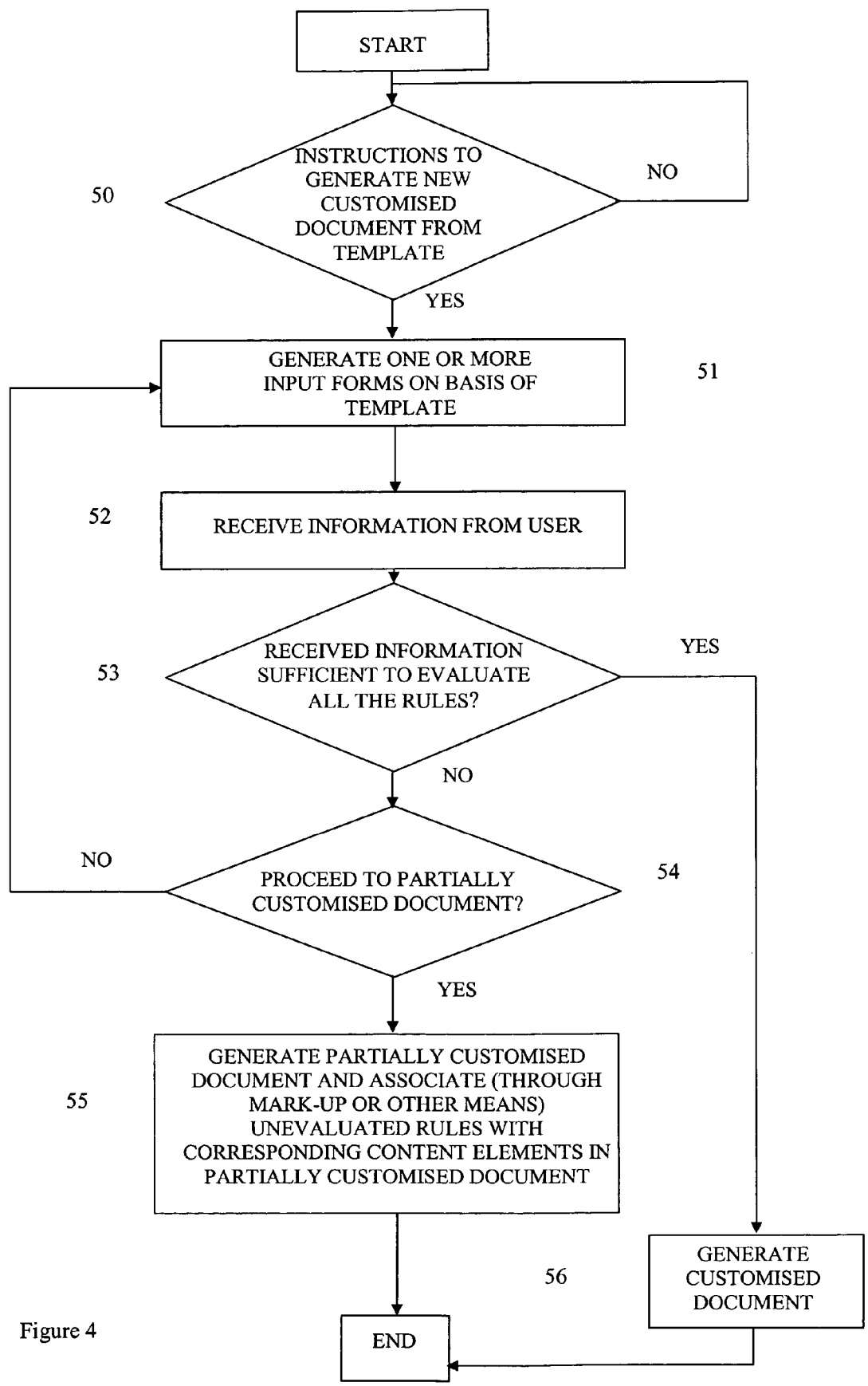
FIG. 4 is a flow diagram showing the stages in producing a customised document.

FIG. 4 is a flow diagram showing the process followed by the document generation program. At step 50, the document generation program waits for an instruction from the user to generate a new customised document from a template. On receiving such an instruction, the document generation program generates, at step 51, a first input form on the basis of the rules contained in the template. The user then enters information, using the input form, which is received by the document generation program at step 52. Then, at step 53, the document generation program determines whether the received information is sufficient to evaluate all the rules. If yes, the process continues to step 56 where the document generation program generates a customised document. If no, then the process continues to step 55, where the document generation program determines whether or not it should proceed to generate a partially customised document. If it should, then the process continues to step 56 where such a document is generated. If there is no request from the user to produce a partially customised document (for example, a tick box on the Web input form has been left blank), then the process returns to step 51, and generates further Web input forms for capturing further information from the user. This process is completed until sufficient information is captured to produce either a fully customised document, or a satisfactory partially customised document.

The partially customised document contains not only the content elements, the inclusion of which has been determined by the various rules within the template, but also the rules which have not been evaluated. Therefore, the partially customised document contains the same information content as the template, and also illustrates the effect of the remaining conditional statements on the final, fully customised document. The partially customised document will form the template of the fully customised document, when the document generation program next generates a form to capture the remaining information. The association between the content elements and rules which have not been evaluated in the partially customised document may be represented by means of a mark-up.

Figure 5:
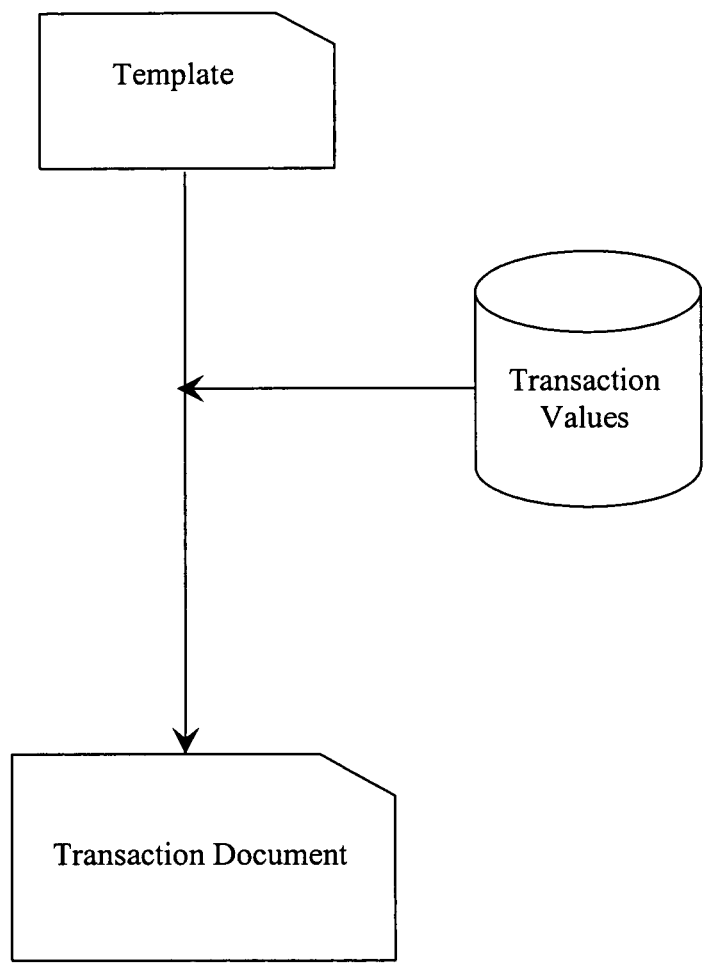
FIG. 5 is a schematic illustration of the relationship between the transaction values, the template and the generated document.
Figure 6:
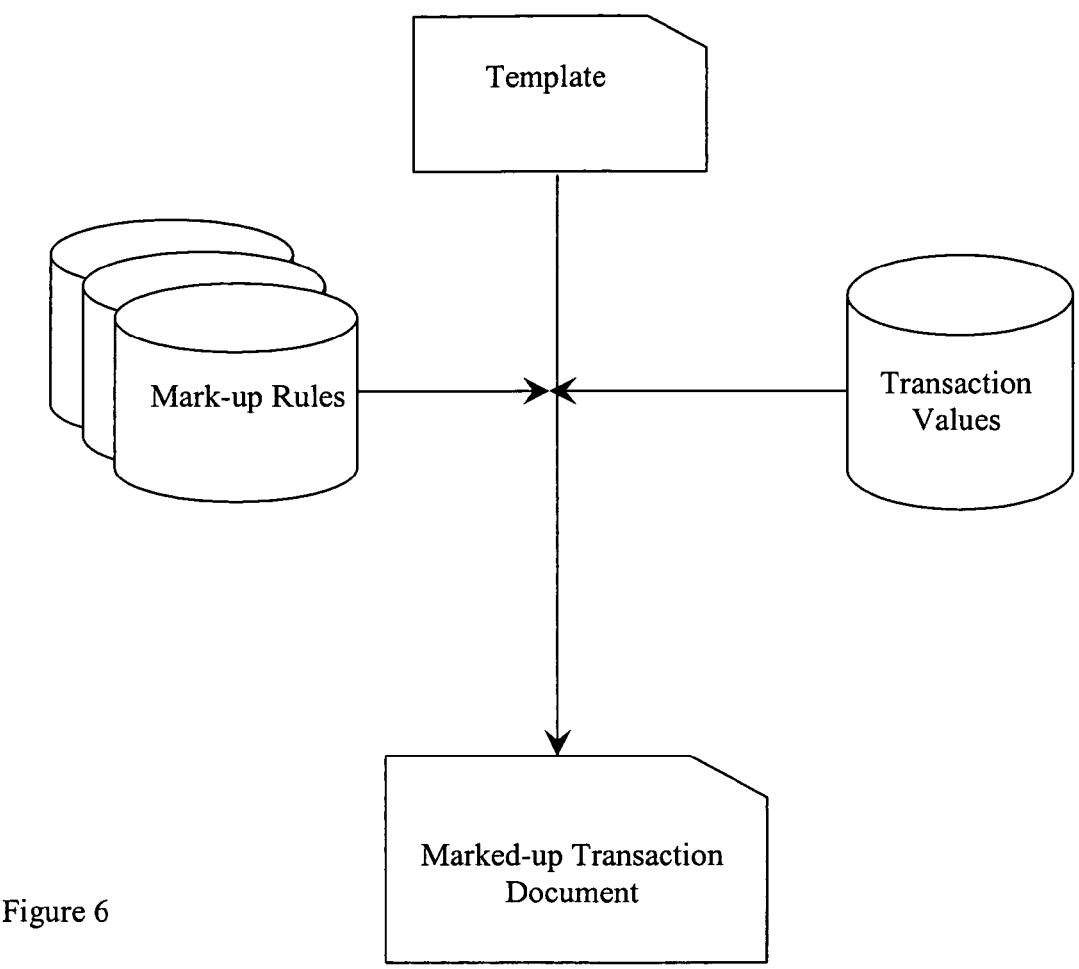
FIG. 6 is a schematic illustration of the relationship between mark-up rules and transaction values.

Embodiments of the present invention provide a mark-up scheme that is not only able to indicate incomplete conditional statements (by including content elements and their associated rules) but can also indicate missing or indefinite transaction values. FIG. 4 is a schematic diagram of the relationship between the template, the transaction values and the customised document. FIG. 5 is a schematic illustration of how the mark up rules relate to the transaction values and a marked-up, partially customised document.

The mark-up rules primarily govern what information is inserted when a transaction value is missing, what information is inserted when a transaction value is indefinite, and how conditional text is represented when its associated usage statement cannot be determined in any definite manner, either through missing or indefinite transaction values. A simple example of a series of rules which enable the document generation program to cope with missing or indefinite transaction values in this manner, is described below.

When a transaction value is missing, its name is inserted in coloured italics (for example, blue), embraced by curly { } brackets:

"The company name is "{Company Name}"."

When a transaction value is indefinite, the alternatives are delimited using the pipe | character:

"ABC Holdings is a |registered company |partnership |PLC|."

When conditional text, which is dependent on transaction values, cannot be resolved, this is indicated in the partially customised document as superscript coloured text (for example, red) inserted between square [ ] brackets of the same colour:

"ABC Holdings [$^{Type\ IS\ \text{"registered company"}}$ (company number ABC/213) whose registered office is at] [$^{Type\ IS\ NOT\ \text{"registered company"}}$ of] Floor 14, ABC House, London E5."

Similar mark-up rules may be defined for all the other content elements that may appear in a template, such as calculations involving transaction values, the inclusion or attachment of other documents or data files, drafting notes to aid the user or clause labels and cross-references.

The scheme of mark-up rules given above is merely an illustration of a possible format for such a scheme. It is possible for the user to design their own set of mark-up rules, based on personal preference, or to select a set of pre-defined mark-up rules from a series of options given in the document generation program. This will result in any documents being generated by the document generation program, containing transaction values, having the chosen mark-up. The mark-up relating to the content elements and associated rules can also be chosen by the user, to suit personal preferences, and is therefore more flexible than in existing systems.

The use of such a mark-up enables the production of several types of documents, which would fall under the general heading of partially customised documents, which are not available with existing prior-art systems. For example, the document generation program may generate a fully customised document, in which all of the transaction values are known. This may also be referred to as a transaction document.

It is possible to generate different types of partially customised documents. For example, work-in-progress transaction documents, in which most, but not all of the transaction values are known, and which contains marked-up placeholders for missing or indefinite transaction values may be produced. Alternatively, sub-template documents may be produced. In these, some of the transaction values are known to have specific values, and therefore the sub-template only contains the portions of the original template which are relevant to these known values.

It is also possible to produce a fully re-generated template, for which no transaction values have been supplied, but marked up to show where values are missing and their effect on the customised document that the document generation program will eventually generate from the template. This re-generated template will have the same information content as the original template.

Various modifications to the invention, which are within the scope of the appended claims, will be clear to those skilled in the art.

What is claimed is:

1. A document generation system for generating a customized document using content elements selected by rules operating on input information, the operating information comprising transaction values, the system comprising:
   at least one computer having a document generation program stored thereon, the program being operable to:
   a) evaluate the rules based on the input information;
   b) generate a partially customised document containing content elements, the inclusion of which has been determined by the rules, and content elements whose inclusion is dependent on rules that have not yet been evaluated; and
   c) evaluate mark-up rules associated with the content elements, to indicate in the generated partially customised document whether the transaction values are definite, indefinite or absent wherein the system is capable of generating a partially customized document by evaluating the rules to select some of the content elements, and wherein the system further comprises means to associate further rules with the transaction values, to indicate in the generated document whether the transaction values are definite, indefinite or absent.

2. The document generation system of claim 1, wherein the at least one computer is part of a client server network, comprising at least one client computer and at least one server computer.

3. The document generation system of claim 2, wherein the at least one client computer and the at least one server computer communicate using a communication protocol.

4. The document generation system of claim 3, wherein the communication protocol is at least one of TCP/IP or HTTP.

5. The document generation program of claim 2, wherein the at least one computer is a server computer.

6. The document generation program of claim 2, wherein the at least one computer is a client computer.

7. The document generation system of claim 1, wherein the mark-up rules are user defined.

8. The document generation system of claim 1, wherein the mark-up rules are selected from a pre-determined menu.

9. The document generation system of claim 1 further comprising means to allow a user to select one or more of the transaction values.

10. The system of claim 1, wherein including content elements whose rules have not yet been evaluated in the partially completed document, comprises including the content elements and their associated rules.

11. The system of claim 1, wherein where a transaction value is missing, its name is inserted in the partially completed document.

12. The system of claim 1, wherein where a transaction value is indefinite, the alternatives are delineated in the partially completed document.

13. A computer-implemented method of document generation using external data and received information, the method comprising:
    accessing a template comprising content elements and transaction values for use when generating a document;
    accessing data associated with the template, the data representing at least one rule for making at least one determination of the use of the content elements and transaction elements, and at least one mark-up rule;
    receiving information enabling at least one determination to be made;
    evaluating the at least one rule based on the received information;
    generating a partially customised document containing content elements, the inclusion of which has been determined by the at least one rule, and content elements whose inclusion is dependent on rules that have not yet been evaluated;
    evaluating at least one mark-up rule associated with the content elements, to indicate in the generated partially customised document whether the transaction values are definite, indefinite or absent.

14. The computer-implemented method of claim 13, wherein including content elements whose rules have not yet been evaluated in the partially completed document, comprises including the content elements and their associated rules.

15. The computer-implemented method of claim 13, wherein where a transaction value is missing, its name is inserted in the partially completed document.

16. The computer-implemented method of claim 13, wherein where a transaction value is indefinite, the alternatives are delineated in the partially completed document.

17. A computer program product comprising a computer readable medium having stored thereon program instructions which when run on a computer causes the computer to perform the steps of:
    accessing a template comprising content elements and transaction values for use when generating a document;
    accessing data associated with the template, the data representing at least one rule for making at least one determination of the use of the content elements and transaction elements, and at least one mark-up rule;
    receiving information enabling at least one determination to be made;
    evaluating the at least one rule based on the received information;
    generating a partially customised document containing content elements, the inclusion of which has been determined by the rules, and content elements whose inclusion is dependent on rules that have not yet been evaluated;
    evaluating the at least one mark-up rule associated with the content elements, to indicate in the generated partially customised document whether the transaction values are definite, indefinite or absent.

18. The computer program product of claim 17, wherein including content elements whose rules have not yet been evaluated in the partially completed document, comprises including the content elements and their associated rules.

19. The computer program product of claim 17, wherein where a transaction value is missing, its name is inserted in the partially completed document.

20. The computer program product of claim 17, wherein where a transaction value is indefinite, the alternatives are delineated in the partially completed document.

* * * * *